A. P. LUNDIN.
BICYCLE PUMP LOCK.
APPLICATION FILED AUG. 15, 1919.
1,338,512.
Patented Apr. 27, 1920.
2 SHEETS—SHEET 1.
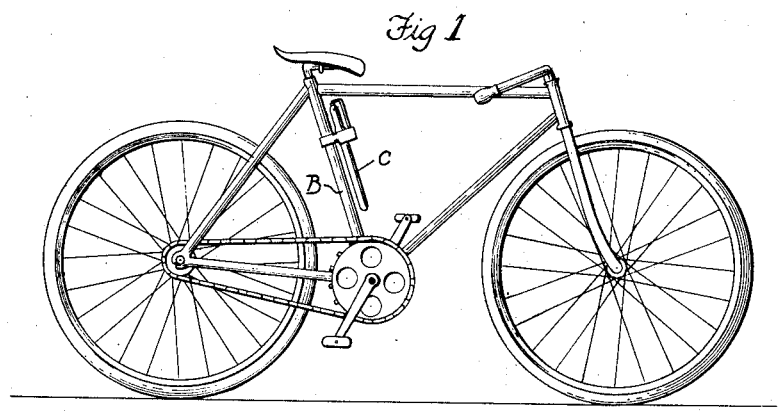
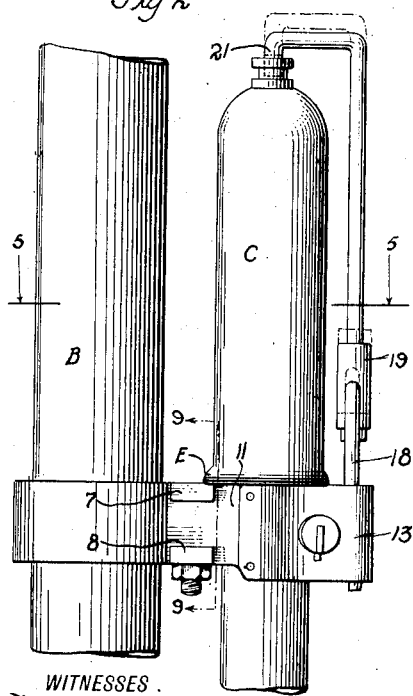
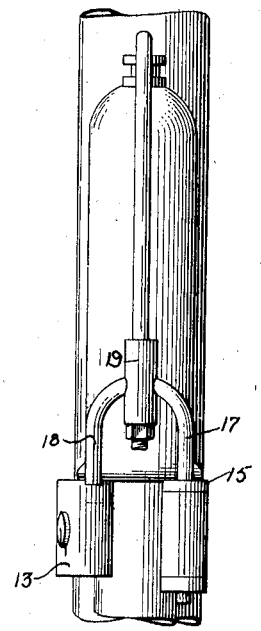
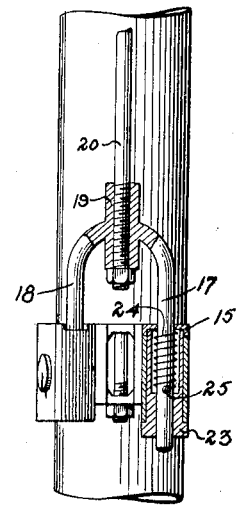
WITNESSES
F. Frederick
J. C. Ledbetter
INVENTOR
ADOLF PER LUNDIN
BY Mmm Co
ATTORNEYS

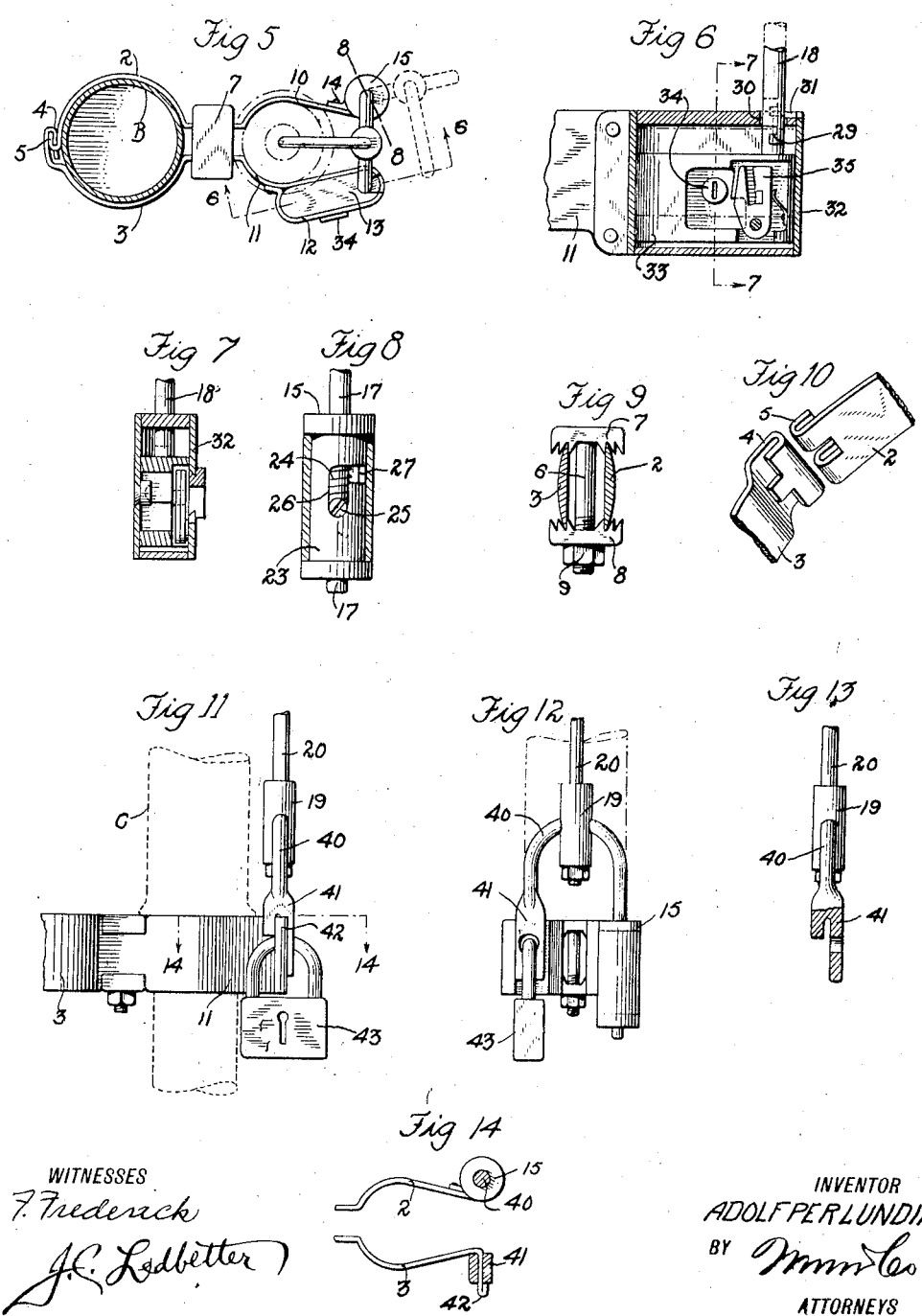

UNITED STATES PATENT OFFICE.

ADOLF PER LUNDIN, OF JOHANNESBURG, TRANSVAAL, SOUTH AFRICA.

BICYCLE-PUMP LOCK.

1,338,512.    Specification of Letters Patent.    Patented Apr. 27, 1920.

Application filed August 15, 1919. Serial No. 317,745.

*To all whom it may concern:*

Be it known that I, ADOLF PER LUNDIN, a citizen of Transvaal, South Africa, residing in Bez Valley, Johannesburg, Transvaal, South Africa, have invented a new and Improved Bicycle-Pump Lock, of which the following is a full, clear, and exact description.

This invention relates to a bicycle lock, and more particularly to a lock for securing a bicycle pump to the frame of said cycle.

A particular object of the invention is to provide a locking means permanently secured to one frame bar of the bicycle and positively locking the pump thereon to prevent unscrupulous removal.

It is a broad purpose of my invention to provide a form of bicycle pump lock which will positively engage the pump, and which will automatically move out of engagement with said pump when the lock is opened by a key.

Finally, it is a purpose to provide the design of an effective form of bicycle pump lock which will be comparatively simple in construction, inexpensive to manufacture, and unlikely to get out of working order.

With the above and other objects in view the invention has relation to a certain combination and arrangement of parts, an example of which is described in the following specification, pointed out in the appended claims, and illustrated in the accompanying drawings, wherein:

Figure 1 shows a bicycle with a pump locked thereon.

Fig. 2 shows a detailed side elevational view of a fragment of frame with the pump attached thereto; while Fig. 3 shows a front view of Fig. 2.

Fig. 4 shows a view taken in the same direction as Fig. 3, but with some parts of the device shown in sectional view.

Fig. 5 is a sectional view taken upon the line 5—5 of Fig. 2; and Fig. 6 is a sectional view taken upon the line 6—6 of Fig. 5.

Fig. 7 shows a sectional view taken upon the line 7—7 of Fig. 6; and Fig. 8 shows a sectional view taken upon the line 8—8 of Fig. 5.

Fig. 9 illustrates a sectional view taken upon the line 9—9 of Fig. 2.

Fig. 10 shows the locking ends of a clamp band employed in this invention.

Fig. 11 shows a modified form of the locking device, and Fig. 12 shows a front view of Fig. 11.

Fig. 13 shows a fragmentary view of Fig. 12, and Fig. 14 shows a view taken upon the line 14—14 of Fig. 11.

Referring now more in particular to the drawings, wherein the same parts throughout the several views are designated by identical reference characters, B represents the frame bar of the bicycle upon which a clamp and locking means may be installed.

A clamp band comprising members 2 and 3 is placed around the bicycle bar and hooked together by the locking ends illustrated in Fig. 10 by engaging the interlocking hooks 4 and 5. The clamp band is brought together as shown in Fig. 9 with a bolt 6 interposed therebetween. This bolt is provided with a serrated head 7 and serrated washer 8 which engage the clamp members 2 and 3. A nut 9 tightens the clamping bolt and serrrated members against the clamp members and securely engages said clamp to the bicycle bar B.

The clamp members or sections are shaped and formed into a pump receptacle opening as designated by 10 and 11. The forward end 11 of the clamp band is drawn around the lock as designated by the numeral 12 and lapped back and riveted upon said member 11. The lock 13 is, therefore, fixed to the band 11.

The pump holding band 10 is wrapped around a cylindrical guide or receptacle and riveted to the band as designated by the numeral 14. Thus the cylindrical guide or receptacle 15 and lock 13 are held in a spaced relation, and firmly attached to the clamp band 2—3.

The bicycle pump C is confined between the pump holding bands 10 and 11 and locked in position as later seen.

A lock yoke comprising parallel members 17 and 18 is provided with an integral boss 19 with a bore therein and fitted to a screw-threaded pump retaining rod 20. The upper end of the pump retaining rod is shaped into a locking pin 21 which normally and in locked position engages a hole in the upper end of the pump C. A bicycle pump is usually made with a shoulder E which is a part of the pump handle or pump barrel, and this shoulder will be placed in engagement with the pump holding band, and the retaining rod and locking pin engage with the pump to securely hold the shoulder E against the bands to prevent removal thereof.

One member or leg 17 of the lock yoke is rotatably confined within the cylindrical guide 15. This cylindrical guide is internally bored and provided with a bushing 23 longitudinally bored to receive the lower end of the yoke leg 17. The bushing is provided with an enlarged bore in the upper portion so as to retain a compression spring 24. This compression spring is confined upon the leg 17 within the enlarged bore of the bushing with one end of the spring engaging a pin 25 carried within the leg and the upper end engaging the top of the cylindrical guide 15. This compression spring normally acts to keep the leg 17 in downwardly limited position. The bushing is provided with a guide slot 26 cut vertically therein and connecting with another slot 27 formed approximately at right angles with the slot 26. The pin 25 is slidably confined within the slot 26—27, and normally seated, under the action of the spring, as shown in Fig. 8. The leg 18 of the lock yoke is adapted to engage in locked relation with the lock 13. The lower end of the leg 18 has formed therein lock slots 29 which engage locking levers of the lock 13. The lock 13 is provided with an aperture 30 in the upper wall thereof which connects with a slot 31. The aperture 30 receives the lower end of the leg 18 and securely locks it in position.

The lock 13 comprises a shell 32 slidably retaining therein a block 33. A key receptacle 34 is fitted in the lock casing. A dog 35 is pivoted in the lock casing. A key is introduced into the key receptacle 34 to displace the dog 35 which permits the slide block 33 to be moved upwardly. Simultaneous with this action, locking levers disengage the slots 29, thus permitting the leg 18 to undergo upward displacement. The dog 33 under the lifting movement of the key expels the leg 18 from the casing. The yoke will then be pivoted about the leg 17 which will disengage the part 18 from the lock. This disconnects the lock from the cylindrical guide and permits the pump bands 10 and 11 to be slightly expanded so as to allow removal of the pump.

The pump may be placed back in the locking bands, and the locking yoke swung into position until the leg 18 registers with the aperture 30. The automatic action of the spring 24 will then thrust the locking yoke into fixed engagement with the lock 13.

Figs. 11, 12, 13 and 14 illustrate a modified design of the bicycle lock. This design comprises means for employing an ordinary pad-lock in connection with the pump securing means where it is preferable to dispense with the more expensive form of lock 13.

The design of all parts is substantially the same except a lock yoke 40 is provided with a flattened end 41 which is provided with a pad-lock opening for receiving the locking arm of a padlock. The end 41 of the yoke is forked as illustrated in Fig. 13. The outer end of the clamp arm 11 is shaped in the form of a bracket 42. The forked end of the yoke is pushed into engagement with the bracket 42 so that a hole in the bracket and a hole in the fork will register. A padlock 43 will then be snapped in position securely holding the pump retaining rod in downward engagement with the pump. This form of construction adequately locks the pump upon a bicycle frame.

In case breakage of the lock parts occurs, it is possible for the owner of the bicycle to reëquip the bicycle lock with a lock 13, or reëquip with a pad lock 43. In case he desires to reëquip the lock device with the pad lock, it will only be necessary to remove the lock yoke 17—18 and substitute therefor the lock yoke 40 fitted with the end 41 provided with a hole through which the shank of a pad lock may be inserted, and also add the part 11 to the device.

This form of bicycle lock is simple in its application to a bicycle frame and provides positive security against unscrupulous removal of the pump from the bicycle.

Having thus described my invention, what I claim as new, and desire to secure by Letters Patent is:

1. A pump lock for bicycles comprising, a clamp band to hold a bicycle pump and adapted to be fixed on the frame, a lock having one end of the clamp band fixed thereto, a cylindrical guide fixed to the other end of the clamp band, said guide having a bayonet slot, a lock yoke pivoted in the cylindrical guide and adapted to catch in the lock, a pin on the lock yoke confined in the bayonet slot, a spring on the lock yoke to restrain it normally downward, and said bayonet slot functioning to hold the lock yoke upwardly against the pressure of the spring to hold said lock yoke out of engagement with the lock.

2. A pump lock to hold a bicycle pump comprising, a clamp capable of being fixed to a bicycle frame, a lock fixed to the clamp, a cylindrical casing fixed to the clamp, a bushing in the cylindrical casing, a clamp yoke swingingly confined in the bushing, a catch pin made on the lock yoke, a spring confined on the lock yoke to constrain it normally downward, said bushing and cylindrical guide having a bayonet slot in which the catch pin is confined to hold the lock yoke in disengaged position from the lock.

3. A pump lock for bicycles comprising, a clamp band to hold a bicycle pump and adapted to be fixed on the frame, a lock having one end of the clamp band fixed thereto, a cylindrical guide fixed to the other end of the clamp band, said guide having a bayonet slot, a lock yoke pivoted in the cylindrical guide and adapted to catch in the lock, a pin on the lock yoke confined in the bayonet slot, a spring on the lock yoke to restrain it normally downward, said bayonet slot functioning to hold the lock yoke upwardly against the pressure of the spring to hold said lock yoke out of engagement with the lock, and a pump retaining rod carried by the lock yoke to fixedly hold a bicycle pump in the clamp band.

4. A pump lock to hold a bicycle pump comprising, a clamp capable of being fixed to a bicycle frame, a lock fixed to the clamp, a cylindrical casing fixed to the clamp, a bushing in the cylindrical casing, a clamp yoke swingingly confined in the bushing, a catch pin made on the lock yoke, a spring confined on the lock yoke to constrain it normally downward, said bushing and cylindrical guide having a bayonet slot in which the catch pin is confined to hold the lock yoke in disengaged position from the lock, and a retaining rod carried by the lock yoke to lock a bicycle pump in the aforesaid clamp.

ADOLF PER LUNDIN.